(12) United States Patent
Hong et al.

(10) Patent No.: US 11,677,110 B2
(45) Date of Patent: Jun. 13, 2023

(54) HEATER CONTROL SYSTEM FOR BATTERY PACKS HAVING PARALLEL CONNECTION STRUCTURE, AND METHOD THEREFOR

(71) Applicant: LG CHEM, LTD., Seoul (KR)

(72) Inventors: Sung Ju Hong, Chungcheongbuk-do (KR); Seung Hwan Kim, Chungcheongbuk-do (KR); Seog Jin Yoon, Chungcheongbuk-do (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 255 days.

(21) Appl. No.: 16/604,647

(22) PCT Filed: Aug. 24, 2018

(86) PCT No.: PCT/KR2018/009781
§ 371 (c)(1),
(2) Date: Oct. 11, 2019

(87) PCT Pub. No.: WO2019/078475
PCT Pub. Date: Apr. 25, 2019

(65) Prior Publication Data
US 2020/0168966 A1 May 28, 2020

(30) Foreign Application Priority Data
Oct. 19, 2017 (KR) .................... 10-2017-0136117

(51) Int. Cl.
*H01M 10/6571* (2014.01)
*H01M 10/615* (2014.01)
*H01M 10/63* (2014.01)
*H01M 10/617* (2014.01)
(Continued)

(52) U.S. Cl.
CPC ..... *H01M 10/6571* (2015.04); *H01M 10/486* (2013.01); *H01M 10/615* (2015.04);
(Continued)

(58) Field of Classification Search
CPC .. H01M 10/615; H01M 10/617; H01M 10/63; H01M 10/667; H01M 10/486; H01M 10/6571; Y02E 60/10
See application file for complete search history.

(56) References Cited

U.S. PATENT DOCUMENTS 10,044,080 B2    8/2018   Kim et al.
10,205,205 B2    2/2019   Choi et al.
(Continued)

FOREIGN PATENT DOCUMENTS

CN    103840232 A    6/2014
CN    104835993 A    8/2015
(Continued)

OTHER PUBLICATIONS

International Search Report dated Dec. 4, 2018, issued in corresponding International Patent Application No. PCT/KR2018/009781.
(Continued)

*Primary Examiner* — Lisa S Park
(74) *Attorney, Agent, or Firm* — Morgan, Lewis & Bockius LLP

(57) ABSTRACT

A heater control system for a battery pack and a method for the same in accordance with the present invention relate to a system and a method for the same in which according to temperature deviations generated during heating operations of heaters provided in each battery pack, between battery packs and cells included in the battery packs, each heater is individually controlled to allow the battery packs and the battery cells therein to be heated to a uniform temperature state.

12 Claims, 6 Drawing Sheets

(51) Int. Cl.
H01M 10/667 (2014.01)
H01M 10/48 (2006.01)

(52) U.S. Cl.
CPC ......... H01M 10/617 (2015.04); H01M 10/63 (2015.04); H01M 10/667 (2015.04)

(56) References Cited

U.S. PATENT DOCUMENTS

| 2003/0118891 | A1  |   | 6/2003  | Saito et al. |         |
|---|---|---|---|---|---|
| 2014/0121869 | A1 | * | 5/2014  | Lee ......................... | B60L 58/26 |
|              |    |   |         |               | 701/22  |
| 2014/0329114 | A1 | * | 11/2014 | Rimae ...................... | B60L 1/02 |
|              |    |   |         |               | 429/50  |
| 2016/0359329 | A1 | * | 12/2016 | Kim ....................... | H02J 7/0013 |
| 2017/0120775 | A1 | * | 5/2017  | Murata ................ | B60W 10/26 |
| 2017/0194673 | A1 | * | 7/2017  | Jeon ......................... | H04Q 9/00 |

FOREIGN PATENT DOCUMENTS

| CN | 106785235 A    |   | 5/2017  |
|---|---|---|---|
| JP | H10284133      | * | 10/1998 |
| JP | 2000-294298 A  |   | 10/2000 |
| JP | 2012-234749 A  |   | 11/2012 |
| JP | 2013-055019 A  |   | 3/2013  |
| JP | 2013-207927 A  |   | 10/2013 |
| JP | 2014-160593 A  |   | 9/2014  |
| JP | 20150071758    | * | 6/2015  |
| KR | 10-2014-0111187 A |   | 9/2014  |
| KR | 10-2015-0002983 A |   | 1/2015  |
| KR | 10-2015-0059247 A |   | 6/2015  |
| KR | 10-2015-0071758 A |   | 6/2015  |
| KR | 10-2015-0130696 A |   | 11/2015 |
| KR | 10-2016-0143092 A |   | 12/2016 |
| KR | 10-1734717 B1  |   | 5/2017  |
| KR | 10-2017-0081868 A |   | 7/2017  |

OTHER PUBLICATIONS

First Office Action dated Nov. 30, 2020, issued in corresponding Japanese Patent Application No. 2020-504087.

Office Action issued by the Chinese Patent Office dated Feb. 21, 2022 in corresponding Chinese Patent Application No. 201880016727.5.

* cited by examiner

HEATER CONTROL SYSTEM FOR BATTERY PACKS HAVING PARALLEL CONNECTION STRUCTURE, AND METHOD THEREFOR

TECHNICAL FIELD

The present invention relates to a heater control system for a battery pack and a method for the same, and more particularly, to a system in which each of heaters in a parallelly connected battery pack structure is individually controlled to adjust temperature deviation between connected battery packs.

BACKGROUND ART

Batteries are easily used for various product groups and have characteristics of excellent preservability, high energy density, etc. In addition, in terms of not only the first merit that the batteries can reduce use of fossil fuel, but also the fact that by-products due to use of energy are not generated, batteries are spotlighted as an environment-friendly energy source and an energy source for improving energy efficiency.

Due to merits of being usable by charging, batteries are commonly used not only in portable apparatuses such as portable phones and laptop computers, but also in electric vehicles, energy storage systems, etc., serve as a basis of various industries, and provide convenience in ordinary life.

Meanwhile, when the battery is charged in a low-temperature state, the service life of the battery is substantially affected. Therefore, a heater is provided and an operation is performed to heat the battery in a low-temperature state to a temperature state at which battery can be charged.

However, in case of a structure in which a plurality of battery packs are connected in parallel, from the structural characteristics thereof, heat dissipation more actively occurs in a battery pack located outermost than a battery pack located at a central portion. Accordingly, even when heaters are operated in all battery packs connected in parallel, temperature deviation occurs between battery packs.

Such temperature deviation between battery packs may break the balance of potential states between the cells constituting the battery packs, and thus cause a problem in that the service lives of cells become unbalanced.

DISCLOSURE OF THE INVENTION

Technical Problem

In order to resolve the above-mentioned problems, the present invention provides a system and a method in which heaters are individually controlled according to temperature deviation generated during the operation of the heaters such that battery packs are heated to a uniform temperature state.

The present invention also provide a system and a method in which each of heaters included in a battery pack is individually controlled, such that not only temperature deviation between battery packs, but also temperature deviation between cells included in the battery packs can be controlled, whereby inner configurations constituting the battery packs are also heated to a uniform temperature state.

Technical Solution

In accordance with an exemplary embodiment, a heater control system, which is a system configured to control heaters of at least two battery packs connected in parallel, includes a plurality of battery packs comprising a single master pack and at least two slave packs, the master pack including: at least two heating groups including first and second cell arrays each including a plurality of cells and a heater provided between and configured to heat the first and second cell arrays; a master communication unit configured to connecting communication with the slave packs; and an operation determination unit configured to determine whether to operate heaters of the slave packs on the basis of temperature data received from each slave pack through the master communication unit and transmit a heater operation control signal for the heaters in the slave packs according to a determination result, the slave packs each including: at least two heating group each including first and second cell arrays including a plurality of cells, and a heater provided between and configured to heat the first and second cell arrays; a slave communication unit configured to connect communication with the master pack; a temperature data calculation unit configured to measure the temperatures of the first and second cell arrays at certain period intervals and calculate temperature data for determining whether to operate the heater in the slave packs on the basis of the measured temperature; and a first heater operation control unit configured to control an operation of each heater in response to the heater operation signal received from the master pack.

Meanwhile, each of the heaters of each heating group may be provided with an operation power switch for applying operation power of the heater, and the first heater operation control unit may control on/off of the operation power switch in response to a control signal received from the master pack.

Meanwhile, the temperature data calculation unit may include: a cell array temperature measuring unit configured to measure the temperatures of the first and second cell arrays; a heating group temperature data calculation unit configured to calculate temperature data of the corresponding heating group using the measured temperature values of the first and second cell arrays; a pack temperature data calculation unit configured to calculate pack temperature data of the corresponding slave pack using the measured temperature data of the heating group, and the calculated heating group temperature data and the pack temperature data may be transmitted to the master pack via the slave communication unit.

Meanwhile, the heater operation determination unit may include: a storage unit configured to store, for each slave pack, the heating group temperature data and the pack temperature data which are received from each slave pack; a pack temperature deviation calculation unit (132) configured to extract maximum pack temperature data and minimum pack temperature data from the pack temperature data of each slave pack stored in the storage unit, and calculate a temperature deviation of the pack temperature data; a heating group temperature deviation calculation unit (133) configured to extract maximum heating group temperature data and minimum heating group temperature data from the heating group temperature data of each slave pack stored in the storage unit, and calculate a temperature deviation of the heating group temperature data; a first determination unit (134) configured to compare whether the calculated pack temperature deviation exceeds a predetermined first reference value, and in case of exceeding, transmit a first operation stop signal for stopping heating operations of heaters to the slave pack corresponding to the maximum pack temperature data; and a second determination unit (135) configured to compare whether the calculated heating group temperature deviation exceeds a predetermined second reference value, and in case of exceeding, transmit, to a corresponding slave pack, a second operation stop signal for stopping heating operations of heaters in the heating group corresponding to the maximum heating group temperature data.

Thus, the first heater operation control part, when receiving the first operation stop signal from the master pack, may turn off the operation power switches include in a pack, and when receiving the second operation stop signal from the master pack, turn off the operation power switches of the heaters in the corresponding heating group.

Also, the slave pack may further include: a heater temperature measuring unit configured to measure the temperature of each heater; and a second heater operation control unit configured to compare the measured temperature value of each heater and predetermined third and fourth reference values, and according to comparison results, control the operation of the corresponding heater, wherein the second heater operation control unit, when the measured temperature value of the heater is less than the predetermined third reference value, may turn on the operation power switch of the corresponding heater, and when the measured temperature value of the heater exceeds the predetermined fourth reference value, may turn off the operation power switch of the corresponding heater.

In accordance with another exemplary embodiment, a heater control method, which controls heaters of at least two battery packs connected in parallel, includes: a heating operation start step of receiving heater operation power through connection to an external charging apparatus and starting a heating operation; a temperature data calculation step of a slave pack measuring temperatures of first and second cell arrays at certain period intervals and calculating temperature data of the corresponding slave pack on the basis of the measured temperatures; a temperature data transmitting step of transmitting the calculated temperature data to a master pack; a temperature data storing step of the master pack storing, for each slave pack, the temperature data received from at least two slave packs; a slave pack heater operation determination step of determining whether to operate heaters in each slave pack on the basis of the stored temperature data and according to determination results, transmitting, to the corresponding slave pack, a heater operation control signal; and a first heater operation control step of the slave pack individually controlling an operation of each heater in response to the control signal received from the master pack.

Here, the temperature data calculation step may include: a cell array temperature measuring step of measuring temperatures of the first and second cell arrays of each of at least two heating groups included in a slave pack; a heating group temperature data calculation step of calculating temperature data of the corresponding heating group using the measured temperatures of the first and second cell arrays; and a pack temperature data calculation step of calculating pack temperature data of the corresponding slave pack using the calculated heating group temperature data.

Meanwhile, the slave pack heater operation determination step may include: a pack temperature deviation calculation step of extracting maximum pack temperature data and minimum pack temperature data from among the stored pack temperature data for each slide pack, and calculating a temperature deviation of the pack temperature data; a first determination step of comparing the calculated pack temperature deviation exceeds a predetermined first reference value, and in case of exceeding, transmitting a first operation stop signal for stopping the heating operation to the slave pack corresponding to the maximum pack temperature data; a heating group temperature deviation calculation step of extracting maximum heating group temperature data and minimum heating group temperature data from among the stored heating group temperature data for each slide pack, and calculating a temperature deviation of the heating block temperature data; and a second determination step of comparing the calculated heating group temperature deviation exceeds a predetermined second reference value, and in case of exceeding, transmitting, to the corresponding slave pack, a second operation stop signal for stopping the heating operation-s of the heating group corresponding to the maximum heating group temperature data.

Accordingly, the heater operation control step, when receiving the first operation stop signal from the master pack, may turn off operations of all the heaters include in a pack, and when receiving the second operation stop signal from the master pack, may turn off operations of heaters of the corresponding heating group.

Meanwhile, the heater control method may further include: a heater temperature measuring step of the slave pack measuring the temperature of each heater included in the pack; and a second heater operation control step of comparing the measured temperature values of each heater and predetermined third and fourth reference values, and controlling the operation of each heater according to comparison results, wherein when the measured temperature values of the heater is less than the predetermined third reference value, the operation of the heater may be turned on, and when the measured temperature values of the heater exceeds the predetermined fourth reference value, the operation of the heater may be turned off.

Advantageous Effects

According to an exemplary embodiment, in a structure of battery packs connected in parallel, each of heaters provided inside a single pack is individually controlled, whereby not only temperature deviations generated between the battery packs, but also temperature deviation generated inside the battery pack can be managed. Thus, it is possible to heat the battery pack structure to an uniform overall temperature state.

Accordingly, the problem of unbalance in potentials and service lives of the cells due to temperature deviations can be prevented and it is possible to provide batteries having improved efficiency.

MODE FOR CARRYING OUT THE INVENTION

Figure 1:
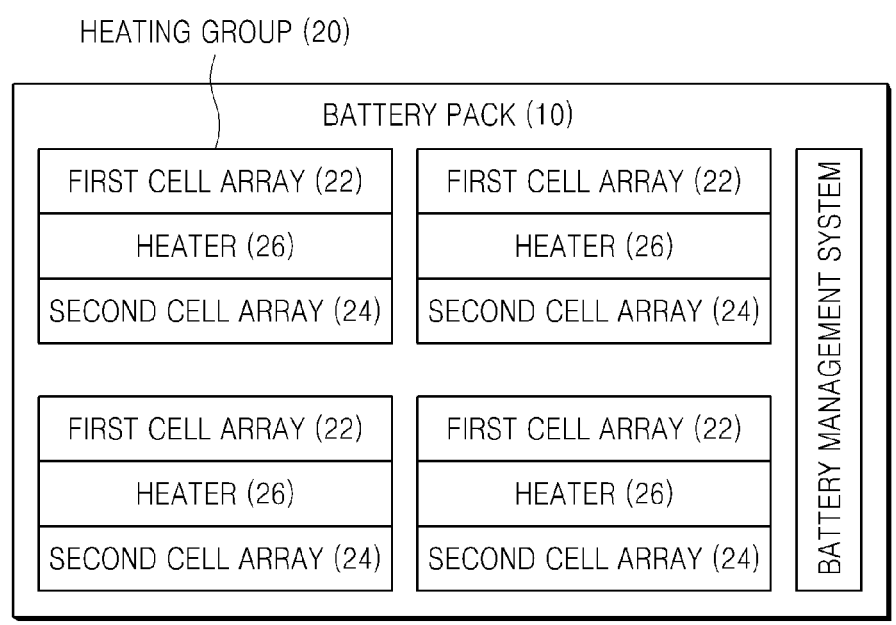
FIG. 1 is a block diagram schematically illustrating an inner structure of a battery pack in accordance with the present invention.

Hereinafter, embodiments of the present invention will be described in detail with reference to the accompanying drawings so that the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and like reference numerals in the drawings denote like elements.

Although the terms such as "first" and "second" are used herein to describe various elements, these elements should not be limited by these terms. These terms are only used to distinguish one element from other elements. For example, a first element could be termed a second element, and similarly, a second element could be termed a first element, without departing from the scope of the present invention. In the following description, the terms are used only for explaining a specific exemplary embodiment while not limiting the present invention. The singular forms are intended to include the plural forms as well, unless the context clearly indicates otherwise.

Throughout the description, it will be understood that when an element is referred to as being 'connected' or 'coupled' to another element, it can be 'directly connected or coupled' to the other element, or 'electrically connected to the other element via an intervening element. Furthermore, it will be further understood that when an element is referred to as "including" another element, the element does not exclude the other element but may further include the other element, unless particularly stated otherwise. The terms "step of (performing)" or "step of (doing)" used in the entire specification of the present disclosure does not mean "step for".

The terms used in the present invention are selected from the general terms that are widely used at present if possible and in consideration of the functions in the present invention, but the terms may be changed depending on the intent of a person skilled in the art or the precedents, or by the emergence of new technologies, etc. Further, certain terms may be arbitrarily chosen, in which case the corresponding meaning will be described in detail in the present invention. Accordingly, the terms used in the present invention should be defined not simply on the basis of the names of the terms, but on the basis of the meanings of the terms and the context throughout the description.

1. Overview of System and Method of Present Invention 1.1 Master Pack 100

A heater control system and a method in accordance with the present invention; relate to at least two or more battery packs connected in parallel.

In a parallel connection structure of battery packs, one battery pack is set as a mater pack, which serves a role of receiving state information from a plurality of slave packs to be described later connected in parallel to the master pack, and transmitting a control command to each of the slave packs on the basis of the state information to control the operation of the slave pack.

Here, the master pack serves the above-described role of a master pack and is also a slave pack, and thus, the master pack also controls its own operation according to its own state information That is, the master pack is a master pack and is also a slave pack and thus serves a role of a master pack and also serves a role of a slave pack.

1.2 Slave Pack 200

The slave pack, as described above, calculates its own state information and transmits the information to the master pack. Here, the state information in the present invention relates to a temperature state of corresponding slave pack.

Each of slave packs connected in parallel to the master pack transmits its own temperature state information to the master pack, and thus operates in response to a control command transmitted from the master pack.

That is, in a structure of battery packs connected in parallel, the battery packs are divided into a master pack and a slave pack according to physical connection, and any pack may serve roles of a master and a slave.

1.3 External Charging Apparatus

A heater provided to each battery pack operates by receiving operation power applied from an external charging apparatus other the battery pack. When a current is generated while the battery pack is in a under voltage (UV) state or in a low temperature state, the service life of the battery pack may be decreased. Therefore, the heater is configured to perform heating operation by receiving operation power from an external apparatus other than the battery pack. That is, each of heaters of the battery pack can operate only in a state of being connected to an external charging apparatus, and each heater is provided with an operation power switch that controls the application of power from the external apparatus to the heater, and thus, the heating operation of each heater may be individually controlled. This will be described in more detail when describing system configuration.

2. Structure of Battery Pack in Accordance with the Present Invention

Before describing a system and a method for heater control in accordance with the present invention, an inner structure of a battery pack used in the exemplary embodiment will be described.

Referring to FIG. 1, a battery pack 10 in accordance with the present invention has a structure in which four heaters 26 connected in parallel are provided therein, and cell arrays 22 and 24 are respectively connected to an upper portion and a lower portion of a single heater. That is, the battery pack has a structure in which two cell arrays share a single heater, and the heater is located between the two cell arrays to heat each cell array. In addition, each battery pack is provided with a battery management system (BMS).

In addition, in the exemplary embodiment, a single heating group 20 is set to include a single heater 26 and two cell arrays 22 and 24 sharing the heater, and as heaters forms a parallel connection structure, the heating groups are also connected in parallel.

Accordingly, as illustrated in FIG. 1, a single battery pack is provided with four heating groups 20 and is configured to include a battery management system that manages and controls the heating groups.

Here, a master pack 100 and a slave pack 200 are the same battery pack 10, and have functions and roles which are set different from each other according to physical connections thereof. FIG. 1 is provided to describe an inner structure of the battery pack 10, and schematically illustrates only a single battery pack without dividing the battery packs into a master pack and a slave pack.

Figure 2:
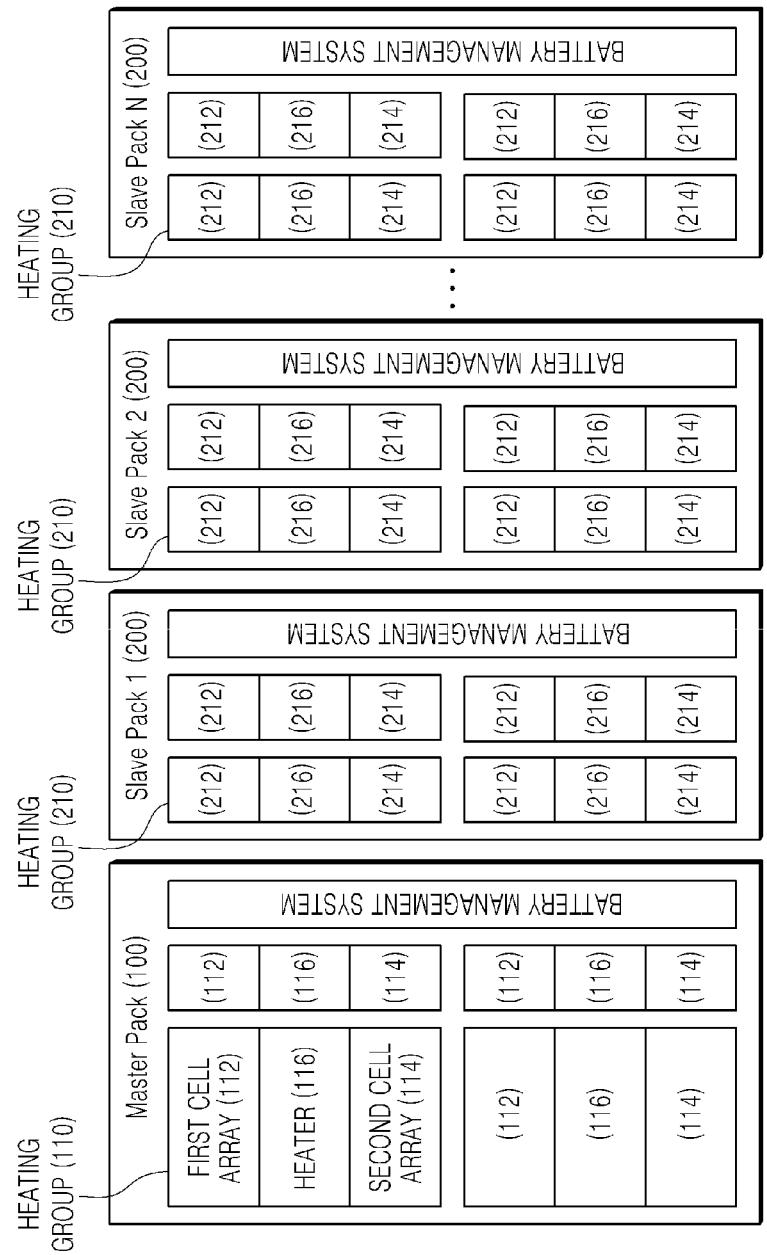
FIG. 2 is a block diagram schematically illustrating a structure of a battery pack connected in parallel in accordance with the present invention.

The present invention relates to a system and a method for the same in which the battery packs in FIG. 1 are provided in plurality and, as illustrated in FIG. 2, form a parallel connection structure between the packs, and the connected battery packs are set as a single master pack 100 and a plurality of slave packs 200 (slave packs 1-N) to adjust the temperature deviation which is generated between the packs during heating operations of heaters and between heating groups in a single pack.

Here, FIG. 1 illustrates that a total of four heaters and eight cell arrays are provide inside each battery pack, but embodiments are not limited thereto, and may vary according to cases such as system environment. In addition, connection structures between battery packs are also not limited to the structures illustrated in drawings, and may have different shapes within a range of parallel connection structure.

3. Heater Control System for Battery Pack in Parallel Connection Structure in Accordance with the Present Invention A system for controlling heaters of at least two battery packs connected in parallel in accordance with the present invention is provided with a single master pack and slave packs connected in parallel to the master pack.

Before describing each component, an operation of each component will be described on the assumption that heaters in each battery pack are in states capable of performing heating operations, that is, being connected to external charging apparatus, and each battery pack is in a low temperature state and in a state of requiring a heating operation that heats the battery pack to a chargeable temperature state. Here the master pack monitors the temperature states of the slave packs connected in parallel, and when the temperature states are lower than a reference temperature value by which a low temperature state is determined, may determine the pack to be in a low temperature state, and this is a well known feature.

In the present invention, while the heaters are connected to an external apparatus, heating operations of the heaters may be individually controlled by controlling on/off of an operation power switch provided to each heater. That is, the exemplary embodiment is provided to adjust temperature deviations generated between battery packs connected in parallel and between the heating groups during heating operations of the heaters.

Hereinafter with reference to FIGS. 2 and 3, each component will be described in detail.

3.1 Master Pack 100

A. Heating Group 110

A master pack is configured to include a plurality of heating groups 110. The heating groups are each provided with first and second cell arrays 112 and 114 which are composed of a plurality of cells and a heater 116 provided between the cell arrays. That is, as described above, a single heater 116 and two cell arrays 112 and 114 sharing the single heater are defined as a single heating group 110, and the heating groups 110 form a parallel connection structure.

Here, although not shown, each of the heaters 110 provided inside the pack is individually provided with an operation power switch 1142. The operation power switch 1142 is, as described above, a component which controls the application of operation power supplied from an external charging apparatus to heaters, and is individually provided to each heater, whereby a heating operation of each heater may be individually controlled by controlling on/off of each operation power switch 1142 according to a temperature state.

In addition, the heater has a pad shape, and first and second cell arrays are respectively arranged on the upper and lower portion of the heater and operation power is applied to the heater, whereby the temperatures of the first and second cell arrays may be raised by the heating operation of the heater.

B. Master Communication Unit 120

A master communication unit is a component which provides communication connection between the master pack and the slave packs so that the master pack 100 may receive temperature data from each slave pack 200 and transmit a control command according to the data. The master communication unit 120 may have communication connection by using a CAN bus.

C. Operation Determination Unit 130

An operation determination unit is a component which determines whether to operate the heaters of a slave pack on the basis of temperature date received from each slave pack 200 via the master communication unit 120.

1) Storage Unit 131

A storage unit is a component which stores, for each slave pack, temperature data received from the slave pack 200 connected in parallel to the master pack. Although to be described in detail when describing the configuration of the slave pack 200, the temperature data means heating group temperature data and pack temperature data. The storage unit may store, for example, temperature data of corresponding slave pack matched to the pack number of each slave pack (slave pack 1-N).

2) Pack Temperature Deviation Calculation Unit 132

A pack temperature deviation calculation unit is a component which calculates a temperature deviation between packs using pack temperature data of each slave pack 200 (slave pack 1-N) stored in the storage unit.

In order to calculate the temperature deviation, from among the pack temperature data stored in the storage unit 131 for each slave pack, maximum pack temperature data which is the temperature data having the largest temperature value and minimum pack temperature data which is the temperature data having the lowest temperature value are extracted.

Accordingly, a pack temperature deviation may be calculated as the difference value between the maximum pack temperature data and the minimum pack temperature data. The temperature deviations between the battery packs connected in parallel are calculated, whereby a first determination unit 134 to be described later may determine a temperature unbalance state between battery packs using the temperature deviations.

3) Heating Group Temperature Deviation Calculation Unit 133

A heating group temperature deviation calculation unit is a component which calculates temperature deviations between the heating groups inside a single slave pack using each heating group temperature data of the slave packs 200 stored in the storage unit.

In order to calculate the temperature deviations, from among the heating group temperature data stored in the storage unit 131 for each slave pack, and for each slave pack among the heating group temperature data of the corresponding slave pack, maximum heating group temperature data, which is the temperature data having the largest temperature value, and minimum heating group temperature data, which is the temperature data having the lowest temperature value, are extracted.

Accordingly, a heating group temperature deviation may be calculated as the difference value between the maximum heating group temperature data and the minimum heating group temperature data. Here, the heating group temperature deviation is calculated for each slave pack. Accordingly, a second determination unit 135 to be described later may determine a temperature unbalance state between heating groups inside each slave pack using the heating group temperature deviation.

4) First Determination Unit 134

A first determination unit is a component which determines a temperature unbalance state between packs using the pack temperature deviation calculated from the pack temperature deviation calculating unit 132 as described above.

The first determination unit compares whether the pack temperature deviation exceeds a predetermined first reference value. From the comparison result, when the pack temperature deviation exceeds a predetermined first reference value, the first determination unit determines that temperatures are in an unbalanced state between the packs, and that the heating operation of the slave pack corresponding to the maximum pack temperature data should be stopped. Accordingly, a first operation stop signal, which stops the heating operation of the slave pack corresponding to the maximum pack temperature data, may be transmitted.

Here, the predetermined first reference value may be set to, for example, approximately 1° C.

5) Second Determination Unit 135

A second determination unit is a component which uses the heating group temperature deviation for each slave pack calculated from the heating group temperature deviation calculation unit 133 as described above to determine a temperature unbalance state between heating groups inside each slave pack.

The second determination unit compares whether the heating group temperature deviation exceeds a predetermined second reference value. From the comparison result, when the heating group temperature deviation exceeds the predetermined second reference value, the second determination unit determines that the temperatures are in an unbalance state between the heating groups inside the corresponding pack, and may transmit, to the slave pack having the heating group temperature deviation exceeding the predetermined second reference value, a second operation stop signal which stops the heating operation of the heating group corresponding to the maximum heating group temperature data.

Here, the predetermined second reference value may be set to, for example, approximately 1° C.

6) Third Determination Unit 136

A third determination unit is a component which determines a temperature unbalance state between cell arrays using a temperature deviation between cell arrays transmitted from each slave pack.

The temperature deviation, transmitted from each slave pack, between the first and second cell arrays constituting a heating group included in the corresponding pack should be no greater than a certain reference value. If the temperature deviation between the first and second cell arrays exceeds the certain reference value, it is determined that a design error of the corresponding pack or a problem of cell arrays in temperature sensing has occurred, and a diagnosis function may be performed on the corresponding battery pack. According to the determination of the third determination unit, the diagnosis function is then performed on the battery pack by using a well known technique.

At this point, the certain reference value may be set to, for example, approximately 2° C.

7) Fourth Determination Unit 137

A fourth determination unit, when a heating operation time exceeds a preset heating operation time, may stop the heating operations of all the heaters in a slave pack. The heating operation time is counted from the time point when stating a heating operation for each slide pack, and when the counted time exceeds the preset heating operation time, the heating operations of all the heaters in the corresponding slave pack may be stopped. After stopping the heating operation, whether the pack temperature data of said slave pack is in a predetermined chargeable temperature state is compared, and when in a chargeable temperature state, charging is performed, and when not in a chargeable temperature state, since a chargeable temperature state cannot be reached even though the heating operations of heaters have been performed for the preset heating operation time, it is determined that a heater in the slave pack has a problem or the temperature of external environment of the battery pack is in an ultra low temperature, and then a control may be performed so that charging of said slave pack is not performed. This may be performed by transmitting, to the corresponding slave pack, a heating operation stop signal which stops heating operations of all heaters.

Here, the preset heating operation time may be set to, for example, approximately three hours, but embodiments are not limited thereto, and may vary according to required conditions or heater performance.

Meanwhile, the above-mentioned master communication unit 120 and the operation determination unit 130 are technical components of the battery management system (BMS).

In addition, as described above, the master pack functions as a master pack and as a slave pack, and performs not only the functions of each of the above-mentioned components of the master pack but also the functions of each of the components of the slave pack to be described later.

That is, when the master pack controls the heating operations of heaters in each of the slave packs in order to adjust temperature deviations between the packs and between heating groups in the corresponding pack according to temperature data of each of the slave packs connected in parallel, the master pack adjusts the temperature deviations between the packs and between heating groups in the corresponding pack including its own temperature also.

3.2 Slave Pack 200

A. Heating Group 210

Slave pack is provided to include a plurality of heating groups 210 in the same manner as the inner structure of the master pack. The heating groups are each provided with first and second cell arrays 212 and 214 which are composed of a plurality of cells and a heater 216 provided between the cell arrays. That is, as described above, a single heater 216 and two cell arrays 212 and 214 sharing the single heater are defined as a single heating group 210, and the heating groups 210 form a parallel connection structure.

Here, although not shown, each of the heaters 210 provided inside the pack is individually provided with an operation power switch 2142. The operation power switch 2142 is, as described above, a component which controls the application of operation power supplied from an external charging apparatus, and is individually provided to each heater, whereby a heating operation of each heater may be individually controlled by controlling on/off of each operation power switch 2142 according to a temperature state.

In addition, the heater has a pad shape, and first and second cell arrays are respectively arranged on the upper and lower portion of the heater and operation power is applied to the heater, whereby the temperatures of the first and second cell arrays may be raised by the heater.

B. Slave Communication Unit 220

A slave communication unit is a component which provides communication connection between the slave pack and the master pack so that the slave pack 200 may transmit its own temperature data to the master pack 100 and receive a control command according to the data. The slave communication unit 220 may have communication connection by using a CAN bus.

In addition, the slave pack may transmit data required by the master pack via the slave communication unit.

C. Temperature Data Calculation Unit 230

A temperature data calculation unit 230 is a component which measures the temperatures of the first and second cell arrays 112 and 114 included in the pack at a certain period interval in order to transmit the temperature to the master pack, and calculates temperature data for determining whether to operate the heater on the basis of the temperature.

1) Cell Array Temperature Measuring Unit 231

A cell array temperature measuring unit is a component which measures the temperatures of the first and second cell arrays included in the pack. A single temperature sensor is provide to each of the cell arrays and may measure the temperature of each cell array.

2) Heating Group Temperature Data Calculation Unit 232

A heating group temperature data calculation unit 232 is a component which uses the temperature values of the first and second cell arrays measured from the cell array temperature measuring unit 231 to calculate the temperature data of the corresponding heating group.

The heating group temperature data is calculated as the average of the measured temperature values of the first and second cell arrays. For example, when the temperature of the first cell array is approximately 5° C. and the temperature of the second cell array is approximately 6° C., the temperature data of the heating group corresponding to the first and second cell arrays is calculated as approximately (5+6) ° C./2. Accordingly, for example, when four heating groups are provided to a single slave pack as illustrated in FIG. 1, four heating group temperature data are calculated for each pack through the heating group temperature data calculation unit. That is, the heating group temperature data may be described as a temperature value representing the corresponding heating group.

3) Pack Temperature Data Calculation Unit 233

A pack temperature data calculation unit 233 is a component which uses the calculated heating group temperature data to calculate the pack temperature data of the slave pack corresponding to the calculated heating group temperature data.

The pack temperature data is calculated as the average of heating group temperature data of the heating groups included in a single pack. For example, when a single slave pack is provided with four heating groups, and four pieces of heating group temperature data are calculated for each pack, the pack temperature data is calculated as (sum of four pieces of heating group temperature data)/4.

That is, the pack temperature data may be described as a temperature value representing the corresponding slave pack, and in a structure in which a total of n battery packs are connected in parallel, n pieces of pack temperature data are calculated.

The heating group temperature data and the pack temperature data, which are calculated as described above, are transmitted to the master pack via the slave communication unit 220.

4) Cell Array Temperature Deviation Calculation Unit 234

A cell array temperature deviation calculation unit 234 is a component which calculates a difference between the temperatures of the first and second cell arrays measured from the cell array temperature measuring unit. This temperature deviation, which is calculated to determine a temperature unbalance state between the cell arrays 112 and 114 sharing a single heater 116, is transmitted to the master pack.

D. First Heater Operation Control Unit 240

A first heater operation control part is a component which controls the operation of each heater in response to the control signal transmitted from the master pack 100.

As described above, each heater is individually provided with the operation power switches 1142 and 1242 so as to individually control the heater operation. Accordingly, when receiving the first operation stop signal from the master pack 100, all operation power switches included in the pack may be turned off to stop the entire heating operation of the corresponding pack.

Conversely, when receiving the second operation stop signal from the master pack 100, operation power switches corresponding to the heater of the heating group corresponding to the second operation stop signal may be turned off to stop the entire heating operation of the corresponding heating group.

As such, the first heater operation control part may control, according to a control signal (first operation stop signal or second operation stop signal) received from the master pack, on/off of the heater corresponding to the signal and individually control the heating operation, and thus, may adjust a temperature deviation occurring between the packs and heating groups.

Here, the first heater operation control unit 240, when receiving the first operation stop signal while the heating operation of the corresponding heating group is stopped by receiving the second operation stop signal from the master pack, ignores the heating operation control in response to the second operation stop signal, and stops the entire heating operation of the pack by turning off all heaters in the pack in response to the first operation stop signal.

In addition, when receiving the heating operation stop signal from the master pack, since the signal is a command of stopping heating operations of all the heaters in the pack from the determination that even though a heating operation is performed for a preset heating operation time, the pack in a low-temperature state does not sufficiently reach a chargeable temperature and thus, the heater has a problem or the temperature of external environment is in an ultra low temperature.

E. Heater Temperature Measuring Unit 250/Second Heater Operation Control Unit 260

The slave pack is provided to include a heater temperature measuring unit and a second heater operation control unit.

When the heater temperature measuring unit measures the temperature of each heater included in the pack, the second heater operation control unit may control the heating operation of the heater through the comparison of the measured temperature value of each heater and predetermined third and fourth reference values.

When the measured temperature value of the heater is less than the third reference value, the corresponding heater is controlled so as to perform heating operation to allow the measured temperature value to fall within the optimum reference temperature range. If the operation power switch of the corresponding heater is in the off state, the switch is turned on again so that operation power is applied to the heater and the heater performs a heating operation.

In addition, when the measured temperature value of the heater exceeds the fourth reference value, the corresponding heater is controlled so as to stop the heating operation to allow the measured temperature value to fall within the optimum reference temperature range. If the operation power switch of the corresponding heater is in the on state and the heater is performing a heating operation, the switch is turned off so that operation power is not applied to the heater and the heating operation is stopped.

The optimal temperature reference range means the range between the predetermined third reference value and the predetermined fourth reference value, and this may be set to a range of, for example, approximately 58-60° C.

Accordingly, each slave pack controls each of the heaters included in the corresponding pack to be maintained within the optimal reference temperature value via the heater temperature measuring part and the second heater operation control unit.

The above-described temperature data calculation unit 230, the first heater operation control unit 240, the heater temperature measuring unit 250, and the second operation control part 260 may be described as detailed components of a battery management system provided to the slave pack.

Figure 6:
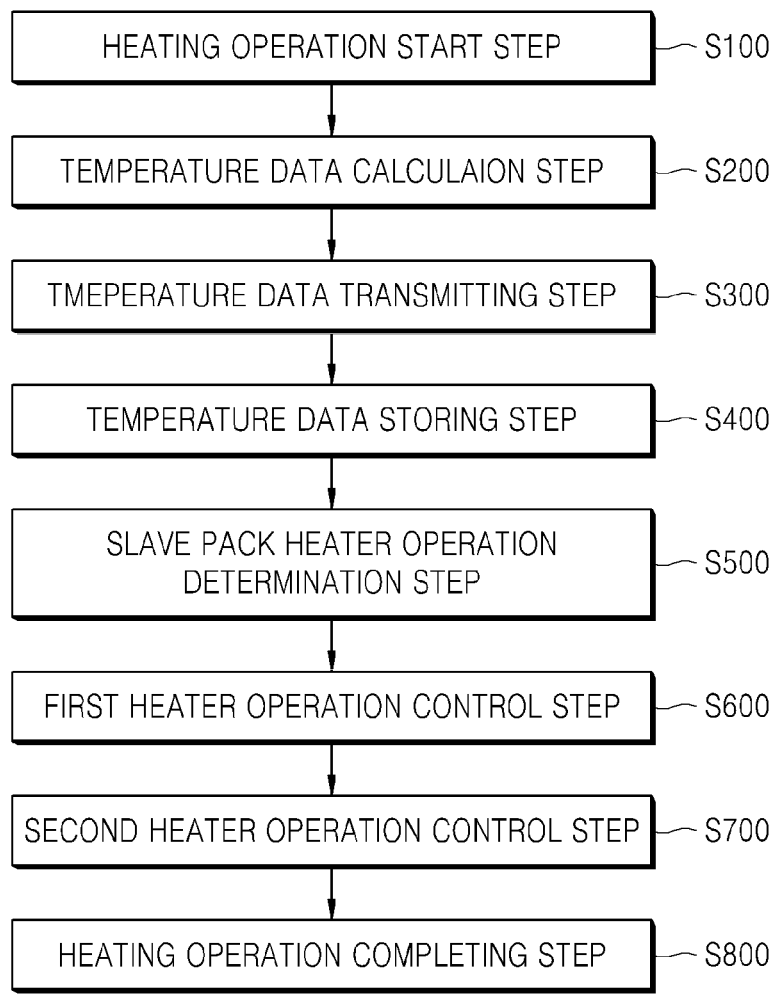
FIG. 6 is block diagram schematically illustrating a method for adjusting temperature deviation during heating operation in a battery pack structure connected in parallel according to the present invention.

4. Heater Control Method in Battery Pack Structure Connected in Parallel According to the Present Invention (FIG. 6)

A method for controlling a heater of a battery pack according to the present invention will be described. As mentioned in system description, assuming that each battery pack is determined to be in a low temperature state and is thereby in a state of requiring a heating operation which heats the battery pack to a chargeable temperature state, each operation step will be described.

Embodiment 1

Figure 4:
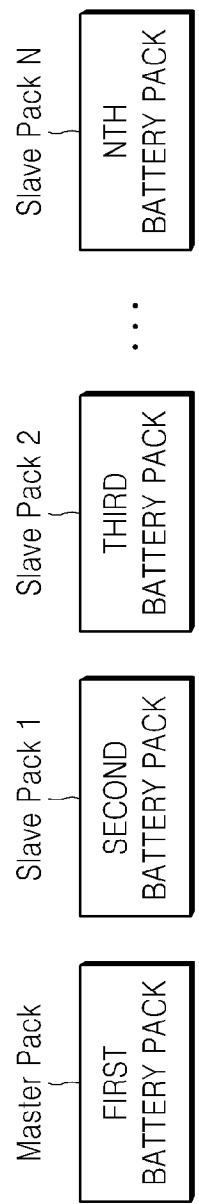
FIG. 4 is a view illustrating an embodiment 1 of division into master packs and slave packs.

Embodiment 1 illustrates, as in FIG. 4, a method for setting, as the master pack, a first battery pack among a plurality of battery packs connected in parallel and adjusting temperature deviations generated in the operations of the heaters between the battery packs and between the heating groups, and each operation step is configured as follows.

A. Heating Operation Start Step (S100)

This heating operation start step is a step which is in a state of being connected to an external charging apparatus, and in which heater operation power is applied from the external charging apparatus and a heating operation is started. As described above, the heater in the present invention performs a heating operation with power applied from an external charging apparatus other than a battery pack. Therefore, the heating operation of the heater may be performed only in a state of being connected to an external charging apparatus.

Here, a heating operation time counting step (S110), in which time of performing heating operation is counted from the start time of the heating operation start step, may further be provided.

B. Temperature Data Calculation Step (S200)

This is a step performed in a slave pack and is a step in which temperature data is calculated at certain period intervals. The calculated temperature data will be used to determine whether to perform a heating operation of a heater. Detailed steps thereof are configured as follows.

1) Cell Array Temperature Measuring Step (S210)

This is a step of measuring the temperatures of the first and second cell arrays constituting each heating group. The temperatures may be measured by using a temperature sensor provided to each of the cell arrays.

2) Heating Group Temperature Data Calculation Step (S220)

The heating group temperature data is calculated as the average of the measured temperature values of the first and second cell arrays. For example, when the temperature of the first cell array is approximately 5° C. and the temperature of the second cell array is approximately 6° C., the temperature data of the heating group corresponding to the first and second cell arrays is calculated as approximately (5+6) ° C./2. Accordingly, for example, when four heating groups are provided to a single slave pack as illustrated in FIG. 1, four pieces of heating group temperature data are calculated for each pack through the heating group temperature data calculation step. That is, the heating group temperature data may be described as a temperature value representing the corresponding heating group.

3) Pack Temperature Data Calculation Step (S230)

This pack temperature data calculation step is a step in which the calculated heating group temperature is used to calculate the pack temperature data of the slave pack corresponding to the calculated heating group temperature data. The pack temperature data is calculated as the average of heating group temperature data of the heating groups included in a single pack. For example, when a single slave pack is provided with four heating groups, and four pieces of heating group temperature data are calculated for each pack, the pack temperature data is calculated as (sum of the four pieces of heating group temperature data)/4.

That is, the pack temperature data may be described as a temperature value representing the corresponding slave pack, and in a structure in which a total of n battery packs are connected in parallel, n pieces of pack temperature data are calculated.

4) Cell Array Temperature Deviation Calculation Step (S240)

A cell array temperature deviation calculation step is a step of calculating a temperature difference between the temperatures of the first and second cell arrays, the temperatures being measured from the cell array temperature measuring unit. The temperature difference is calculated to determine a temperature unbalance state between two cell arrays 112 and 114 sharing a single heater 116.

5) Heater Temperature Measuring Step (S250)

The slave pack measures the temperature of each heater provided in the pack through this heater temperature measuring step.

C. Temperature Data Transmitting Step (S300)

The calculated heating group temperature data, pack temperature data, and cell array temperature deviation are transmitted to the master pack through this temperature data transmitting step. These may be transmitted through CAN communication connection between the master pack and the slave pack.

D. Temperature Data Storing Step (S400)

This is a step performed in the master pack, and is a step of storing, into the storing unit 131 for each slave pack, temperature data transmitted from the slave pack connected in parallel to the master pack, that is, the heating group temperature data, the pack temperature data, and the cell array temperature deviation.

E. Slave Pack Heater Operation Determination Step (S500)

This slave pack heater operation determination step is a step of determining whether to operate the heaters of each slide pack on the basis of the stored heating group temperature data and the pack temperature data, and transmitting a heater operation control signal according to the determination result to the corresponding slave pack. Detailed steps thereof are configured as follows.

1) Pack Temperature Deviation Calculation Step (S510)

This pack temperature deviation calculation step is a step of calculating the temperature deviation between the packs connected in parallel using the pack temperature data stored for each slave pack.

Calculating the temperature deviation between the packs is extracting maximum pack temperature data which is the temperature data having the largest value among the pack temperature data of each slave pack, extracting minimum pack temperature data which is the temperature data having the smallest value, and calculating the difference therebetween. This step is performed by the pack temperature deviation calculation unit 132.

2) First Determination Step (S520)

This first determination step is a step of determining a temperature unbalance state between the packs connected in parallel using the calculated pack temperature deviation. This step compares whether the calculated pack temperature deviation exceeds a predetermined first reference value. From the comparison result, when the pack temperature deviation exceeds a predetermined first reference value, it is determined that temperatures are in an unbalanced state between the packs connected in parallel, and in order to adjust balance, the heating operation of the slave pack corresponding to the maximum pack temperature data should be stopped. Accordingly, a first operation stop signal, which stops the heating operation of the slave pack corresponding to the maximum pack temperature data, is transmitted.

Here, the predetermined first reference value may be set to, for example, approximately 1° C.

3) Heating Group Temperature Deviation Calculation Step (S530)

This heating group temperature deviation calculation step is a step of using the heating group temperature data of the stored pack temperature data for each slave pack and calculating the temperature deviation between the heating groups in each slave pack.

Calculating the heating group temperature deviation is extracting maximum heating group temperature data which is the temperature data having the largest value among the heating group temperature data in each slave pack, extracting minimum heating group temperature data which is the temperature data having the smallest value, and calculating the difference therebetween. Accordingly, a single heating group temperature deviation is calculated for each slave pack.

4) Second Determination Step (S540)

This second determining step is a step of determining a temperature unbalance state between the heating groups in the corresponding slave pack using the calculated heating group temperature deviation for each slave pack.

In this step, comparing the calculated heating group temperature deviation and the predetermined second reference value, and according to the comparison result, a signal which controls the heating operation of the heating groups in the corresponding slave pack may be transmitted. When the heating group temperature deviation exceeds a predetermined second reference value, it is determined that heating groups connected in parallel in the slave pack are in temperature unbalance state, a second operation stop signal which stops the heating operations of heaters of the heating group corresponding to the maximum group temperature data is transmitted to the corresponding slave pack.

Here, the predetermined second reference value may be set to, for example, approximately 1° C.

5) Third Determination Step (S550)

This third determining step is a step of determining a temperature unbalance state using the temperature deviation which is between cell arrays and is received from each slave pack. The temperature deviation, transmitted from each slave pack, between the cell arrays constituting a heating group included in the corresponding pack should be no greater than a certain reference value. If the temperature deviation between the first and second cell arrays exceeds the certain reference value, it is determined that a design error of the corresponding pack or a temperature sensing problem of cell arrays has occurred, and a diagnosis step (S552) for performing a diagnosis function on the corresponding battery pack, and the diagnosis step uses a well-known technique.

Here, the certain reference value may be set to, for example, approximately 2° C.

F. First Heater Operation Control Unit (S600)

This first heater operation control step is a step which is performed in the slide pack and is a step of individually controlling the operation of each heater in response to a control signal received from the master pack. Here, the control signal means the first operation stop signal or the second operation stop signal.

When receiving the first operation stop signal from the master pack, heating operations of all the heaters included in the pack are stopped. As described above, since each heater is individually provided with an operation power switch, the operation power switches of all the heaters in the pack is turned off, whereby the entire operation of the heaters in the pack may be stopped. Accordingly, it is possible to perform adjustment of the temperature deviation with respect to the pack having the minimum temperature data by stopping the heating operation of the pack having a maximum pack temperature data.

Conversely, when receiving the second operation stop signal from the master pack, the operation power switch of the heater of the heating group corresponding to the second operation stop signal in the pack may be turned off to stop the heating operation of the corresponding heating group. Accordingly, it is possible to perform temperature deviation adjustment between the heating groups having the minimum heating group temperature data in the corresponding pack by stopping the heating operation of the heating group having the maximum heating group temperature data in the pack.

As such, in response to the control signal received from the master pack, the heating operation of each heater may individually be controlled and the temperature deviation may be efficiently adjusted.

Here, the slave pack, when receiving the second operation stop signal from the master pack and stopping the heating operation of the corresponding heating group, ignores the heating operation control in response to the second operation stop signal, and stops the entire heating operation of the pack by turning off all the heaters in the pack in response to the first operation stop signal.

G. Second Heater Operation Control Step (S700)

This second heater operation control step is a step in which the temperature value of each heater measured in the heater temperature measuring step (S250) is used for controlling the operation of the heater so that the temperature of each heater is maintained within an optimal temperature reference range.

When the measured temperature value of the heater is less than a predetermined third reference value, the corresponding heater is controlled so as to perform a heating operation to allow the measured temperature value to fall within the optimum reference temperature range. If the operation power switch of the corresponding heater is in the off state, the switch is turned on again so that operation power is applied to the heater and the heater performs a heating operation. In addition, when the measured temperature value of the heater exceeds the fourth reference value, the corresponding heater is controlled so as to stop the heating operation to allow the measured temperature value to fall within the optimum reference temperature range. If the operation power switch of the corresponding heater is in the on state, the corresponding operation power switch is turned off so that operation power is not applied to the heater and the heating operation is stopped.

The optimal temperature reference range means the range between the predetermined third reference value and the predetermined fourth reference value, and this may be set to a range of, for example, approximately 58-60° C.

Accordingly, through such a step, each of the heaters in a slide pack may be controlled to maintain a temperature within the optimal temperature reference range.

H. Heating Operation Completing Step (S800)

This heating operation completing step is a step performed in the master pack and is a step of stopping heating operations of heaters in the slave pack when the heating operation time counted from the heating operation start time exceeds a preset heating operation time. After stopping the heating operation, whether the pack temperature data of each slave pack is in a predetermined chargeable temperature state is compared, and in case of being in a chargeable temperature state, charging is performed, and in case of not being in a chargeable temperature state, since a chargeable temperature state cannot be reached even though the heating operations of heaters have been performed for the preset heating operation time, it is determined that a heater in the corresponding slave pack has a problem or the temperature of external environment of the battery pack is in an ultra low temperature, and then a control may be performed so that charging of the corresponding slave pack is not performed.

Here, the preset heating operation time may be set to, for example, approximately three hours, but embodiments are not limited thereto, and may vary according to required conditions or heater performance.

Embodiment 2

Embodiment 2 of the present invention will be described. In Embodiment 1 of the present invention described above, as illustrated in FIG. 4, a first battery pack was set as a master pack, and through the above-mentioned steps S100 to S800, temperature deviations between a second battery pack to an nth battery pack, which are slave packs, and temperature deviations were adjusted between the heating groups of the corresponding pack.

As described above, setting as and dividing into a master pack 100 and a slave pack 200 among the battery packs connected in parallel may be performed according to physical connection.

Figure 3:
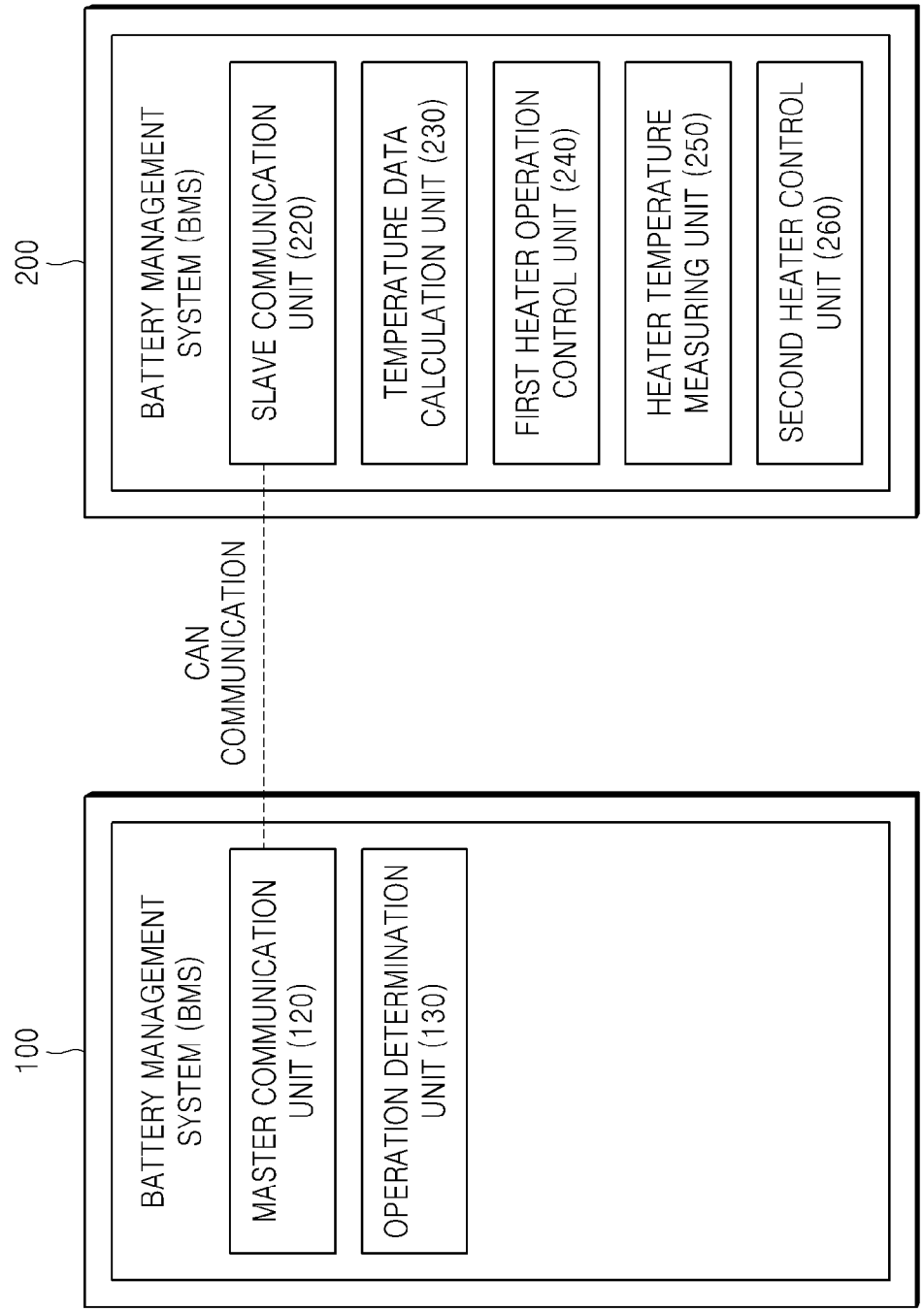
FIG. 3 is a block diagram schematically illustrating respective system configurations of a master pack and a slave pack in accordance with the present invention.

Accordingly, Embodiment 2 of the present invention may be further provided with a master pack reset step (S900), in which as illustrated in FIG. 3 in Embodiment 1, the first battery pack is set as a master pack and steps S100 to S800 are performed, and then, one of the second battery pack to the nth battery pack except for the first battery pack is re-set as the master pack.

Figure 5:
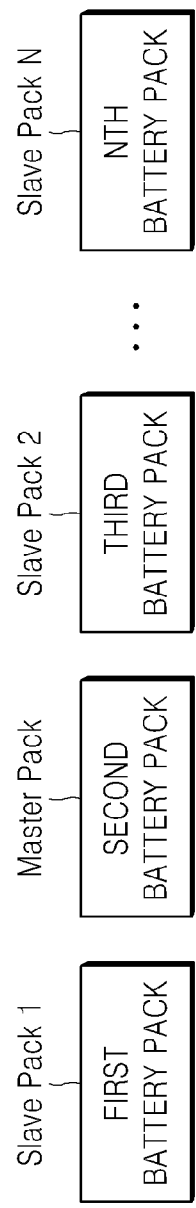
FIG. 5 is a view illustrating an embodiment 2 of division into master packs and slave packs.

The master pack reset step (S900), as illustrated in FIG. 5, the second battery pack is reset as the master pack, and accordingly, except for the second battery pack, the first battery pack and the third to nth battery packs become slave packs (Slave pack 1-N).

After the master pack reset step (S900), as in Embodiment 1, steps S100 to S800 are performed, whereby the second battery pack may perform the function of the above-described master pack, and each of the first and third to nth battery packs may perform the function of the slave pack.

Here, embodiments are not limited to set the second battery pack as the master pack, and in the master pack reset step (S900), a battery pack which was not set as the master pack, that is, any one of the slave packs may be set as the master pack, and according to cases, the same battery pack as the previous one may also be set as the master pack.

As such, setting the master pack and the slave pack from among the battery packs connected in parallel may vary according to physical connection.

So far, the technical idea of the present invention has been specifically described with respect to the above embodiments, but it should be noted that the foregoing embodiments are provided only for illustration while not limiting the present invention. In addition, various embodiments may be provided to allow those skilled in the art to understand the scope of the preset invention.

What is claimed is:

1. A battery system with a heater control system configured to control heaters of a plurality of battery packs connected in parallel, the battery system comprising:
   a single master pack; and
   at least two slave packs,
   wherein each slave pack includes:
      at least two heating groups, each comprising:
         first and second cell arrays comprising a plurality of cells, and
         a heater provided between the first and second cell arrays to be shared by the first and second cell arrays, and configured to heat the first and second cell arrays,
   wherein the master pack includes:
      at least two heating groups, each comprising:
         first and second cell arrays, each comprising a plurality of cells, and
         a heater provided between the first and second cell arrays to be shared by the first and second cell arrays, and configured to heat the first and second cell arrays,
      an operation determination unit configured to:
         determine whether to operate each of the heaters of the at least two slave packs and the master pack, each according to a temperature deviation between the packs and a temperature deviation between the heating groups in the corresponding pack based on temperature data received from each slave pack and temperature data of the master pack, and
         provide a heater operation control signal for operation of each of the heaters in the at least two slave packs and the master pack, according to a corresponding determination result, and a master communication unit configured to:
receive the temperature data from each corresponding slave pack, the received temperature data including pack temperature data of the corresponding slave pack and heating group temperature data of each heating group in the corresponding slave pack, and transmit the heater operation control signal to each corresponding slave pack, and wherein each slave pack further includes:
a slave communication unit configured to connect communication with the master pack and to transmit the temperature data to the master pack, a temperature data calculation unit configured to measure the temperatures of the first and second cell arrays at certain period intervals and to calculate the temperature data based on the measured temperatures for determining whether to operate each of the heaters in the slave pack, and a first heater operation control unit configured to control an operation of each heater in the slave pack in response to the heater operation control signal received from the master pack through the slave communication unit.

2. The battery system with the heater control system of claim 1, wherein:
the heater for each of the heating groups in each slave pack is provided with an operation power switch for applying operation power of the heater, and
the first heater operation control unit is configured to control an on/off operation of the operation power switch based on the heater operation control signal received from the master pack.

3. The battery system with the heater control system of claim 2, wherein the temperature data calculation unit comprises:
a cell array temperature measuring unit configured to measure the temperatures of the first and second cell arrays, respectively;
a heating group temperature data calculation unit configured to calculate heating group temperature data of the corresponding heating group using the measured temperature values of the first and second cell arrays in the corresponding heating group; and
a pack temperature data calculation unit configured to calculate pack temperature data of the corresponding slave pack using the calculated temperature data of the heating groups in the corresponding slave pack,
wherein the calculated heating group temperature data and the pack temperature data are transmitted to the master pack as the temperature data via the slave communication unit.

4. The battery system with the heater control system of claim 3, wherein the operation determination unit comprises:
a storage configured to store, for each slave pack, the heating group temperature data and the pack temperature data, which are received from the slave pack;
a pack temperature deviation calculation unit configured to:
extract a maximum pack temperature data and a minimum pack temperature data from the pack temperature data of each slave pack stored in the storage; and
calculate a temperature deviation of the pack temperature data;

a heating group temperature deviation calculation unit configured to:
extract a maximum heating group temperature data and a minimum heating group temperature data from the heating group temperature data of each slave pack stored in the storage; and
calculate a temperature deviation of the heating group temperature data;

a first determination unit configured to:
compare whether the calculated pack temperature deviation exceeds a predetermined first reference value; and
in case of exceeding, transmit a first operation stop signal to the slave pack corresponding to the maximum pack temperature data for stopping heating operations of all heaters in the corresponding slave pack; and a second determination unit configured to:
compare whether the calculated heating group temperature deviation exceeds a predetermined second reference value; and
in case of exceeding, transmit, to a corresponding slave pack, a second operation stop signal for stopping a heating operation of the heater in the heating group corresponding to the maximum heating group temperature data.

5. The battery system with the heater control system of claim 4, wherein the first heater operation control unit is further configured to:
turn off the operation power switches of all the heaters in the corresponding slave pack if the first operation stop signal is received from the master pack; and
turn off the operation power switch of only the heater in the corresponding heating group if the second operation stop signal is received from the master pack.

6. The battery system with the heater control system of claim 5, wherein each slave pack further comprises:
a heater temperature measuring unit configured to measure the temperature of each heater in the slave pack; and
a second heater operation control unit configured to:
compare the measured temperature value of each heater and predetermined third and fourth reference values; and
according to comparison results, control the operation of the corresponding heater,
if the measured temperature value of the heater is less than the predetermined third reference value, turn on the operation power switch of the corresponding heater; and
if the measured temperature value of the heater exceeds the predetermined fourth reference value, turn off the operation power switch of the corresponding heater.

7. The battery system of claim 1, wherein each of the heaters in the at least two slave packs and the master pack is configured to receive operation power from an external charging apparatus other than the plurality of battery packs.

8. The battery system of claim 1, wherein the temperature data of each of the at least two slave packs and the master pack includes:
the heating group temperature data of each of the heating groups in the corresponding slave pack or master pack calculated based on the measured temperatures of the first and second cell arrays in the corresponding heating group; and the pack temperature data of the corresponding slave pack or master pack calculated based on the heating group temperature data.

9. The battery system of claim 8, wherein the operation determination unit is further configured to determine, based on the pack temperature data for each of the at least two slave packs and the master pack:
whether to turn off all of the heaters in one of the at least two slave packs and the master pack, and
which one of the at least two slave packs and the master pack whose heaters are to be turned off.

10. The battery system of claim 9, wherein the operation determination unit is further configured to determine, for each of the at least two slave packs and the master pack, based on the heating group temperature data for each of the heating groups in the corresponding slave pack or master pack:
whether to turn off the heater for one of the heating groups, and
which of the heating groups whose heater is to be turned off.

11. The battery system of claim 1, wherein the master pack further includes:
a temperature data calculation unit configured to measure the temperatures of the first and second cell arrays in each of the at least two heating groups in the master pack at certain period intervals and to calculate the temperature data for the master pack based on the measured temperatures of the first and second cell arrays of the master pack for determining whether to operate each of the heaters in the master pack; and
a first heater operation control unit configured to control an operation of each heater in the master pack in response to the corresponding heater operation control signal.

12. The battery system of claim 1, wherein the master pack is further configured to operate as another slave pack in addition to the at least two slave packs.

* * * * *